United States Patent
Tanaka

(10) Patent No.: US 7,331,325 B2
(45) Date of Patent: Feb. 19, 2008

(54) DIRECT-INJECTION SPARK-IGNITION INTERNAL COMBUSTION ENGINE

(75) Inventor: Dai Tanaka, Okazaki (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 17 days.

(21) Appl. No.: 11/345,235

(22) Filed: Feb. 2, 2006

(65) Prior Publication Data

US 2006/0169242 A1 Aug. 3, 2006

(30) Foreign Application Priority Data

Feb. 3, 2005 (JP) ............................. 2005-027767
Feb. 3, 2005 (JP) ............................. 2005-027768

(51) Int. Cl.
  *F02B 5/00* (2006.01)
(52) U.S. Cl. ...................... 123/295; 123/298; 123/305
(58) Field of Classification Search ................ 123/276, 123/295, 298, 305
  See application file for complete search history.

(56) References Cited

U.S. PATENT DOCUMENTS

| | | | | |
|---|---|---|---|---|
| 5,967,113 A | * | 10/1999 | Kaneko et al. | ............. 123/295 |
| 6,032,650 A | * | 3/2000 | Rask | .......................... 123/435 |
| 6,386,173 B1 | * | 5/2002 | Yamamoto et al. | ......... 123/295 |
| 6,691,669 B2 | * | 2/2004 | Surnilla et al. | ............. 123/295 |

FOREIGN PATENT DOCUMENTS

| | | | |
|---|---|---|---|
| EP | 1 098 080 A1 | * | 5/2001 |
| JP | 11-210472 A | | 8/1999 |

* cited by examiner

*Primary Examiner*—Erick Solis
(74) *Attorney, Agent, or Firm*—Birch, Stewart, Kolasch & Birch, LLP

(57) ABSTRACT

When an engine is in transitional operation, combustion is carried out by spray guide method. Further, when catalyst temperature T is high, namely, equal to or higher than a specified maximum temperature T1, stratified charge combustion by spray guide method is carried out, and when the catalyst temperature T is low, namely, equal to or lower than a specified minimum temperature T2, stratified charge combustion by wall guide method is carried out.

12 Claims, 8 Drawing Sheets

DIRECT-INJECTION SPARK-IGNITION INTERNAL COMBUSTION ENGINE

BACKGROUND OF THE INVENTION

1. Field of the Invention

This invention relates to a direct-injection spark-ignition internal combustion engine, and specifically, a technique of carrying out stratified charge combustion using spray guide method and wall guide method.

2. Description of the Related Art

In a direct-injection spark-ignition internal combustion engine in which fuel is injected directly into a combustion chamber, a technique called spray guide method is known, in which an injector is fitted to an upper wall of the combustion chamber, in a central area thereof, and an ignition plug is arranged with its electrode part positioned within or near a fuel injection area, so that stratified charge combustion can be carried out by directly igniting fuel spray formed from fuel injected by the injector and vaporized in part.

In the stratified charge lean combustion by this spray guide method, particularly in low-load operation, fuel injection quantity is small and therefore injection period is short, so that the period of time in which ignition can be carried out is short. Thus, there is a problem that in low-load operation, stable combustion region is narrow and stability of combustion is not sufficient.

In order to carry out stratified charge combustion stably in the direct-injection spark-ignition internal combustion engine, a technique has been developed, in which intake air flowing in through an intake port is caused to rise as tumbling flow by a cavity formed in the top face of a piston, and fuel is injected toward the side to which the tumbling flow rises (Japanese Unexamined Patent Publication No. Hei 11-210472).

However, in wall guide method including the type using the tumbling flow, conditions for combustion (fuel injection timing, ignition timing, etc.) vary greatly depending on engine speed and load on the internal combustion engine. Hence, if the engine speed or load changes suddenly and unexpectedly, misfire can happen due to unmatched fuel injection timing, ignition timing, etc. Hence, conventionally, in order to maintain stable combustion, while the internal combustion engine is in transitional operation, ordinary uniform charge combustion is carried out.

As stated above, although the stratified charge combustion has advantages such as improving fuel economy, the stratified charge combustion is carried out limited to specified operational status since it tends to become unstable depending on operational status of the internal combustion engine.

Further, in the spray guide method, fuel spray gradually moves away from the ignition plug, and flames generated by ignition by the ignition plug spread within the combustion chamber following the fuel spray. Thus, combustion progresses relatively slowly. Hence, exhaust gas temperature is relatively low, which causes lowering of the efficiency of conversion by a catalytic converter provided in an exhaust path.

SUMMARY OF THE INVENTION

This invention has been made to solve problems as mentioned above. An object of the invention is to provide a direct-injection spark-ignition internal combustion engine which can carry out stratified charge combustion stably according to operational status of the internal combustion engine, and which can keep a catalytic converter at optimal temperature during stratified charge combustion so that the catalytic converter can perform exhaust cleaning-up function satisfactorily.

In order to achieve this object, the invention provides a direct-injection spark-ignition internal combustion engine comprising an injector fitted to an upper wall of a combustion chamber, in a central area thereof, for injecting fuel directly into the combustion chamber; an ignition plug with an electrode part positioned within or near a fuel injection area in which fuel injected by the injector spreads; a cavity formed in a top face of a piston to guide fuel injected by the injector to near the electrode part of the ignition plug; an operational status detection means for detecting operational status of the internal combustion engine; and an ignition timing control means for controlling ignition timing for the ignition plug, wherein the ignition timing control means controls the ignition timing, depending on the operational status detected by the operational status detection means, such that ignition is carried out at least either during or immediately after fuel injection by the injector, or at the time when fuel injected by the injector arrives near the electrode part by being guided by the cavity.

Further, the invention provides a direct-injection spark-ignition internal combustion engine comprising an injector fitted to an upper wall of a combustion chamber, in a central area thereof, for injecting fuel directly into the combustion chamber; an ignition plug with an electrode part positioned within or near a fuel injection area in which fuel injected by the injector spreads; a cavity formed in a top face of a piston to guide fuel injected by the injector to near the electrode part of the ignition plug; an exhaust catalytic converter provided in an exhaust path connected with the combustion chamber, for converting harmful substances contained in exhaust gas flowing through the exhaust path; a catalyst temperature detection means for detecting temperature of the exhaust catalytic converter; an injection timing control means for controlling injection timing for the injector; and an ignition timing control means for controlling ignition timing for the ignition plug, wherein the injection timing control means and the ignition timing control means can choose between an operation mode in which ignition is carried out during or immediately after fuel injection by the injector and an operation mode in which ignition is carried out at the time when fuel injected by the injector arrives near the electrode part by being guided by the cavity, depending on the temperature of the exhaust catalytic converter detected by the catalyst temperature detection means.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

On the basis of the drawings, an embodiment of this invention will be described below.

Figure 1:
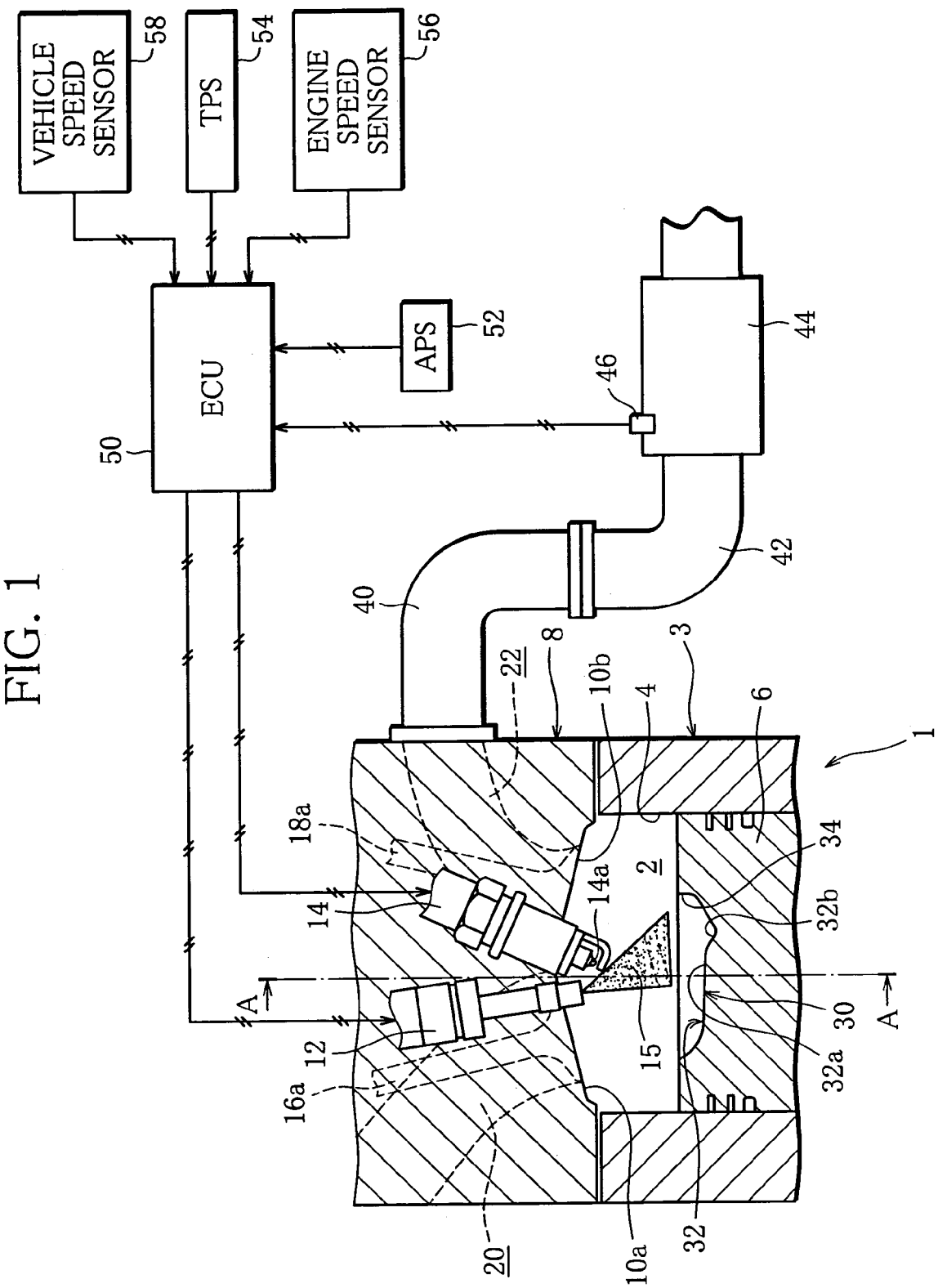
FIG. 1 is a diagram showing schematic structure of a direct-injection spark-ignition internal combustion engine according to this invention.
Figure 2:
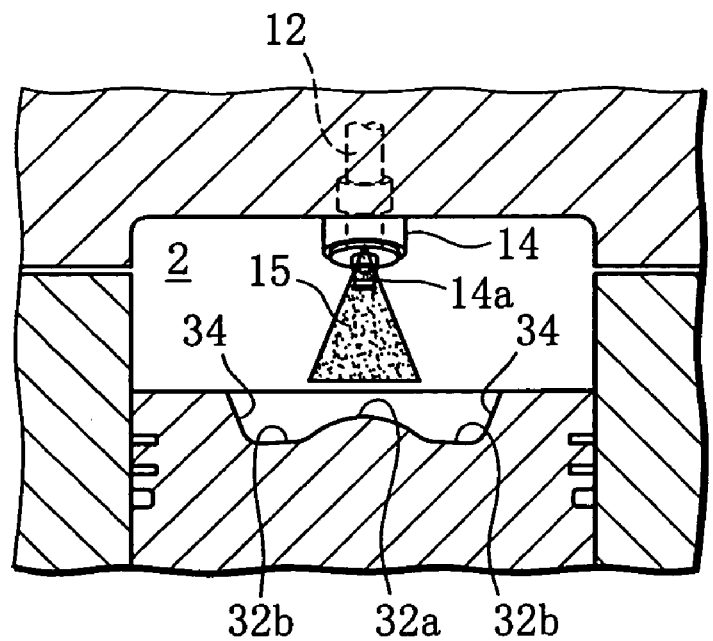
FIG. 2 is a cross-sectional view along line A-A of FIG. 1.
Figure 3:
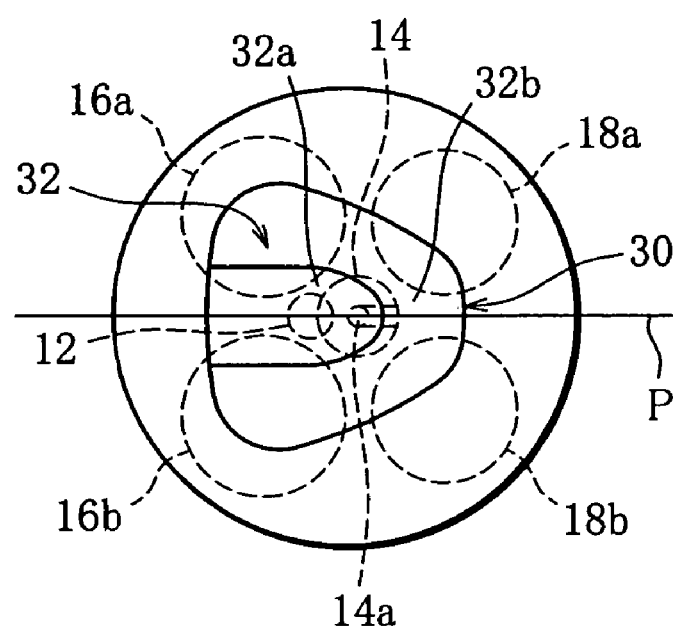
FIG. 3 is a top view of a piston of FIG. 1.

FIG. 1 is a diagram showing schematic structure of a direct-injection spark-ignition internal combustion engine according to this invention, FIG. 2 is a cross-sectional view of a combustion chamber along line A-A of FIG. 1, and FIG. 3 is a top view of a piston of FIG. 1. Description below will be made on the basis of FIGS. 1 to 3.

As shown in FIG. 1, a combustion chamber 2 of an engine 1 (internal combustion engine) is defined by a cylinder-shaped cylinder 4 formed in a cylinder block 3, a top face of a piston 6 fitted to be able to slide up and down within the cylinder 4, and an undersurface of a cylinder head 8 mounted on the cylinder block 3.

The undersurface of the cylinder head 8 which forms an upper wall of the combustion chamber 2 has a so-called pent roof shape consisting of two sloping surfaces 10a, 10b meeting at an obtuse angle.

An injector 12 is fitted to the sloping surface 10a, in a central area of the upper wall of the combustion chamber 2, while an ignition plug 14 is fitted to the other sloping surface 10b.

The injector 12 is arranged to inject fuel, not directly downward but somewhat toward an electrode part 14a of the ignition plug 14. Further, the injector 12 is arranged such that fuel injected by the injector 12 spreads more to the ignition plug 14 side.

Likewise, the ignition plug 14 is arranged to generate electric discharges, not directly downward but somewhat toward the injector 12. Further, the ignition plug 14 is arranged such that the electrode part 14a is located within or near the fuel injection area in which fuel injected by the injector 12 spreads, or in other words, in or near fuel spray 15 produced.

On the sloping surface 10a side, two intake valves 16a, 16b are provided to be located on the opposite sides of the injector 12. On the sloping surface 10b side, two exhaust valves 18a, 18b are provided to be located on the opposite sides of the ignition plug 14.

The intake valves 16a, 16b and exhaust valves 18a, 18b are designed to slide up and down within intake ports 20 and exhaust ports 22 formed in the cylinder head 8 to thereby connect and disconnect each intake port 20 or exhaust port 22 and the combustion chamber 2.

In the following description, the plane containing the end of the injector 12 and the end of the ignition plug 14 and extending within the combustion chamber 2 will be referred to as the plane P, the sloping surface 10a side of the combustion chamber 2 on which the injector 12 and the intake valves 16a, 16b are provided will be referred to as the intake side, and the sloping surface 10b side of the combustion chamber 2 on which the ignition plug 14 and the exhaust valves 18a, 18b are provided will be referred to as the exhaust side.

A cavity 30 is formed on the top face of the piston 6 which forms the bottom surface of the combustion chamber 2.

The cavity 30 has a concave shape consisting of a bottom surface 32 and a wall surface 34.

Specifically, the bottom surface 32 of the cavity 30 generally slopes downward, from the intake side to the exhaust side. The bottom surface 32 includes a raised part 32a higher than its surroundings, which extends from near the center of the bottom surface 32 to the wall surface 34 on the intake side, along the plane P. Thus, the raised part 32a is surrounded by a sunk part 32b, which is an almost U-shape viewed from above.

As shown in FIG. 3, the cavity 30 has opposite edges gradually approaching the plane P, from the intake side to the exhaust side, so that the opening of the cavity becomes narrower from the intake side to the exhaust side.

The wall surface 34 of the cavity 30 slopes upward smoothly from the periphery of the bottom surface 32.

The exhaust ports 22 are connected to an exhaust pipe 42 (exhaust path) by an exhaust manifold 40. An exhaust catalytic converter 44 is provided in the exhaust pipe 42. The exhaust catalytic converter 44 is, for example, a three-way catalytic converter capable of oxidizing HC and CO and reducing NOx.

A catalyst temperature sensor 46 (catalyst temperature detection means) is attached to the exhaust catalytic converter 44. The catalyst temperature sensor 46 is electrically connected to an ECU (electronic control unit) 50 (injection timing control means, ignition timing control means).

The ECU 50 is electrically connected also with an APS (accelerator position sensor) 52 for detecting depression of an accelerator pedal (operational status detection means), a TPS (throttle position sensor) 54 for detecting opening of a throttle (operational status detection means), an engine speed sensor 56 for detecting revolving speed of the engine 1 (operational status detection means), a vehicle speed sensor 58 for detecting vehicle speed (operational status detection means), and devices of various kinds including the injector 12 and the ignition plug 14, and perform control of various kinds.

How the direct-injection spark-ignition internal combustion engine according to the present invention having the above-described structure operates will be described below.

Figure 4:
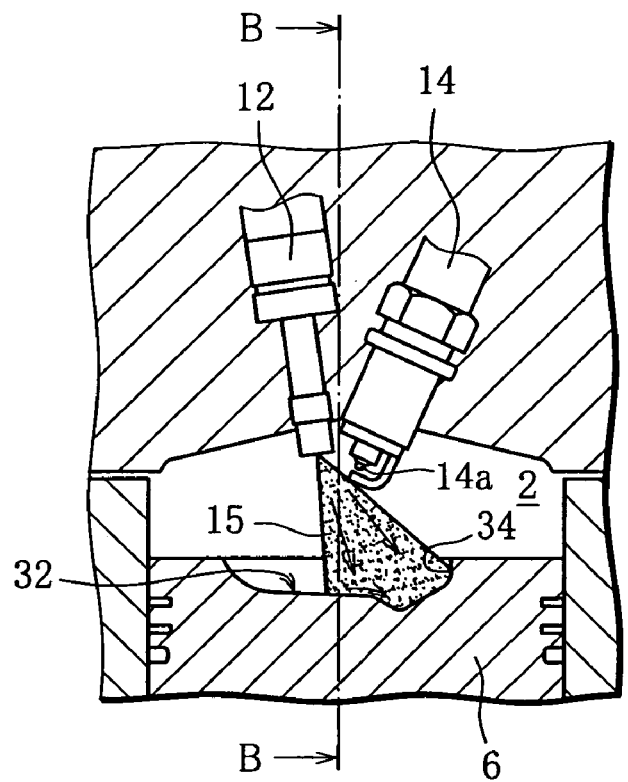
FIG. 4 is a cross-sectional view of a combustion chamber, showing distribution of fuel spray during fuel injection in the direct-injection spark-ignition internal combustion engine according to this invention.
Figure 5:
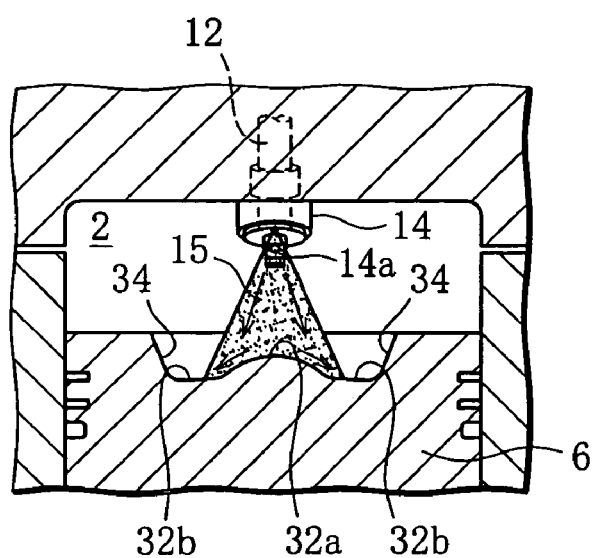
FIG. 5 is a cross-sectional view along line B-B of FIG. 4.
Figure 6:
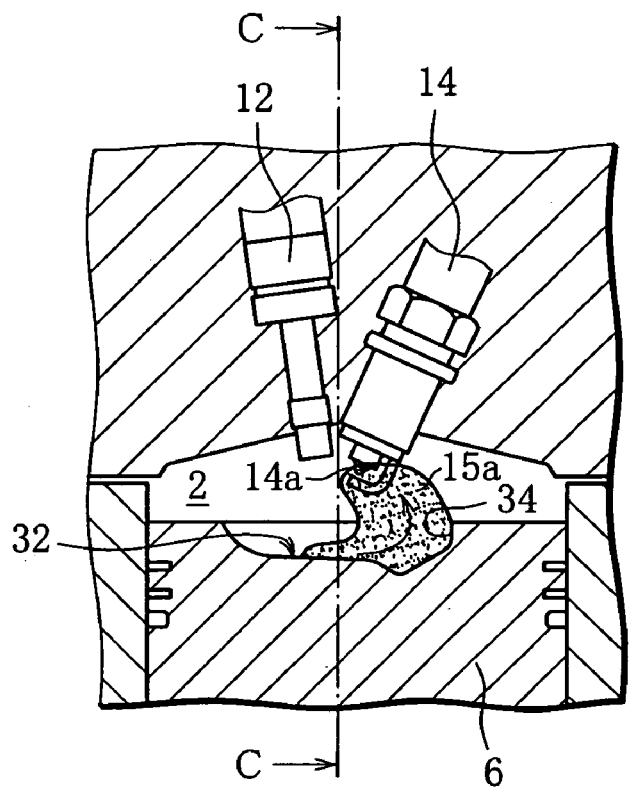
FIG. 6 is a cross-sectional view of a combustion chamber, showing distribution of fuel spray after fuel injection in the direct-injection spark-ignition internal combustion engine according to this invention.
Figure 7:
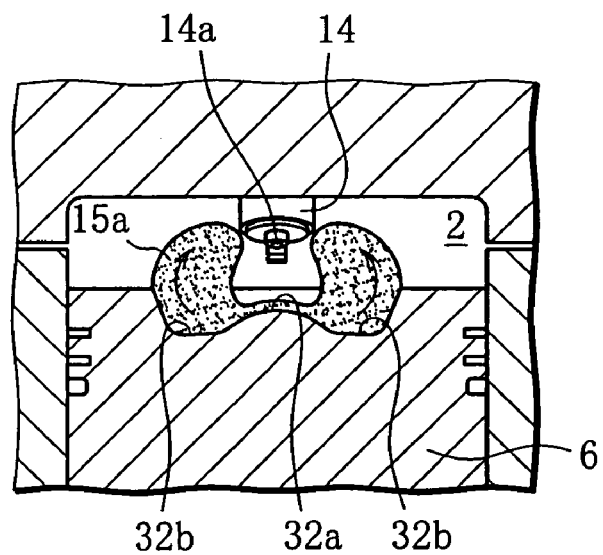
FIG. 7 is a cross-sectional view along line C-C of FIG. 6.

FIG. 4 is a cross-sectional view of the combustion chamber, showing distribution of fuel spray during fuel injection in the direct-injection spark-ignition internal combustion engine according to this invention; FIG. 5 is a cross-sectional view along line B-B of FIG. 4; FIG. 6 is a cross-sectional view similar to FIG. 4, showing distribution of an air-fuel mixture formed by fuel vaporizing after fuel injection in the direct-injection spark-ignition internal combustion engine according to this invention; and FIG. 7 is a cross-sectional view along line C-C of FIG. 6. Description below will be made on the basis of FIGS. 4 to 7.

As shown in FIGS. 4 and 5, when the piston 6 is in late compression stroke, fuel is injected from the end of the injector 12 toward the ignition plug 14 side. Fuel injected turns into fuel spray 15, which passes by the electrode part 14a of the ignition plug 14 and enters the cavity 30 in the top face of the piston 6, mainly on the exhaust side. Here, it is desirable to arrange such that the fuel spray 15 formed by fuel injection by the injector 12 has a hollow-shaped distribution, for example, a hollow cone-like distribution, although not limited to this.

Since the bottom surface 32 of the cavity 30 slopes downward from the intake side to the exhaust side and the fuel spray 15 spreads more to the ignition plug 14 side, the fuel spray 15 that has entered the cavity 30 and collided against the bottom surface 32 of the cavity 30 is guided to the exhaust side in a good manner, while being more vaporized. Here, the fuel spray 15 that has collided against the raised part 32 of the bottom surface 32 is spread to both sides of the raised part 32a and to the exhaust side. Then, as shown in FIGS. 6 and 7, the fuel spray 15 moves upward, guided along the wall surface 34 on the exhaust side, while being further vaporized, and leaves the cavity 30 as an air-fuel mixture 15a.

The air-fuel mixture 15a that has left the cavity 30 like this rises in curves to surround the electrode part 14a of the ignition plug 14. Consequently, there exists a relatively rich air-fuel mixture around the electrode part 14a.

Specifically, since the fuel spray 15 has a hollow-shaped distribution, is spread to both sides by the raised part 32a of the bottom surface 32 of the cavity 30, moves toward the periphery of the bottom surface 32 and rises in curves into the combustion chamber 2, the amount of fuel contained in the air-fuel mixture 15a formed is smaller in its central area. Thus, the air-fuel mixture 15a does not become excessively rich around the electrode part 14a.

Provided that fuel is injected by the injector 12 in the above-described manner, two methods of ignition are conceivable: so-called spray guide method in which fuel spray 15 formed during fuel injection as shown in FIGS. 4 and 5 is directly ignited, and so-called wall guide method in which an air-fuel mixture 15a that has left the cavity 30 and collected around the electrode part 14a as shown in FIGS. 6 and 7 is ignited. Regarding the wall guide method, a type in which an air-fuel mixture is guided to around the electrode part 14a not depending on intake flow such as tumbling flow but on the basis of fuel jet force is preferable. This is because tumbling flow or the like that intake air forms is relatively weak and varies depending on engine operational conditions, and hence, is not sufficient to guide the fuel spray to achieve stable stratified charge combustion.

FIG. 8 is graphs showing, for the spray guide method and the wall guide method, how stable combustion region changes when load conditions change in the direct-injection spark-ignition internal combustion engine according to this invention; and FIG. 9 is graphs showing exhaust gas characteristics of the direct-injection spark-ignition internal combustion engine according to this invention, when the spray guide method is adopted and when the wall guide method is adopted. The features of the spray guide method and of the wall guide method will be described on the basis of FIGS. 8 and 9.

Figure 8A:
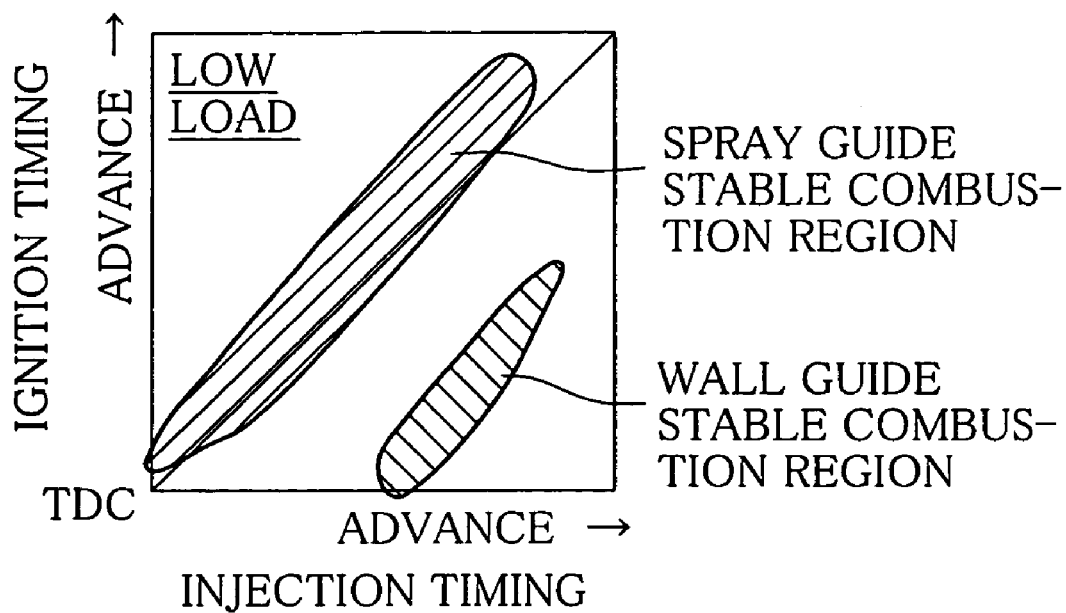
FIGS. 8A-8C are graphs showing, for the spray guide method and the wall guide method, how stable combustion region changes when load conditions change in the direct-injection spark-ignition internal combustion engine according to this invention.
Figure 8B:
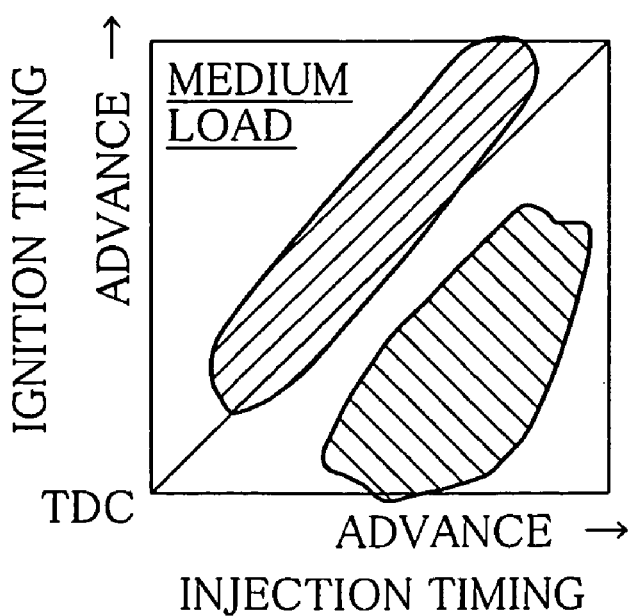
Figure 8C:
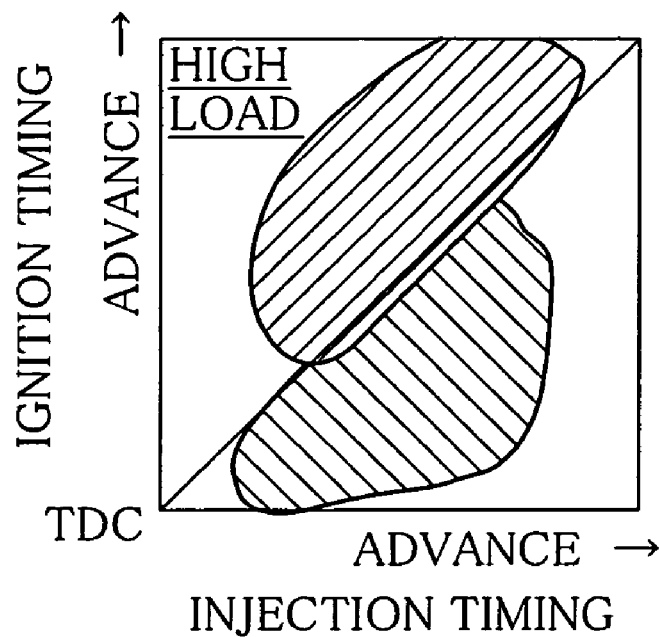

FIGS. 8A, 8B, 8C show stable combustion regions for the spray guide method and the wall guide method, in low-load operation, in medium-load operation and in high-load operation, respectively, where ignition timing is plotted on the vertical axis and injection timing is plotted on the horizontal axis.

As seen from these figures, regarding the wall guide method, the stable combustion region varies when the load changes. Hence, in the wall guide method, it is necessary to change the injection timing and the ignition timing depending on the revolution of the engine 1 and the load, in transition period in which the load changes.

Meanwhile, regarding the spray guide method, since ignition is carried out during or immediately after fuel injection by the injector 12, the stable combustion region is kept relatively constant irrespective of the load change. Thus, the engine can be operated with constant fuel injection timing and ignition timing, not depending on the revolution of the engine 1 and the load.

Thus, the spray guide method has a feature that combustion is stable in the transition period.

Figure 9A:
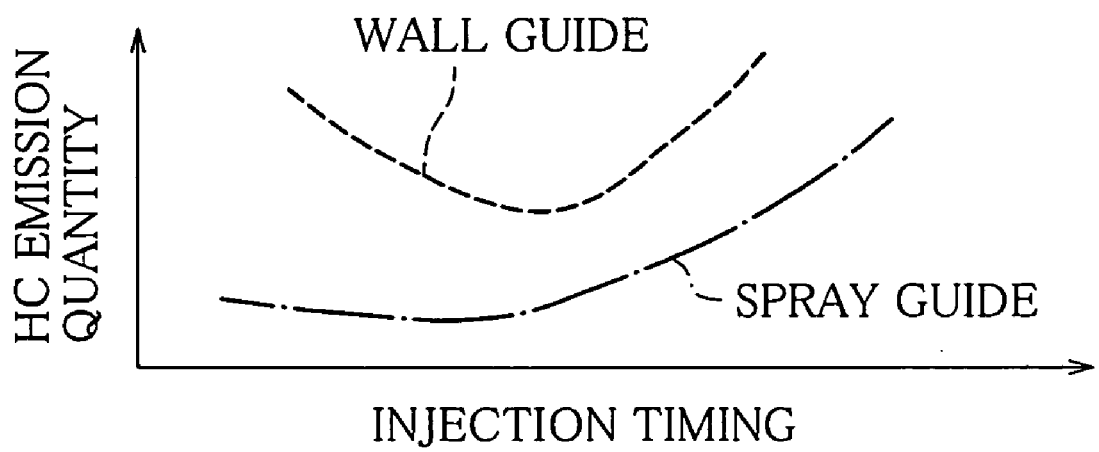
FIGS. 9A-9C are graphs showing exhaust gas characteristics of the direct-injection spark-ignition internal combustion engine according to this invention, when the spray guide method is adopted and when the wall guide method is adopted.
Figure 9B:
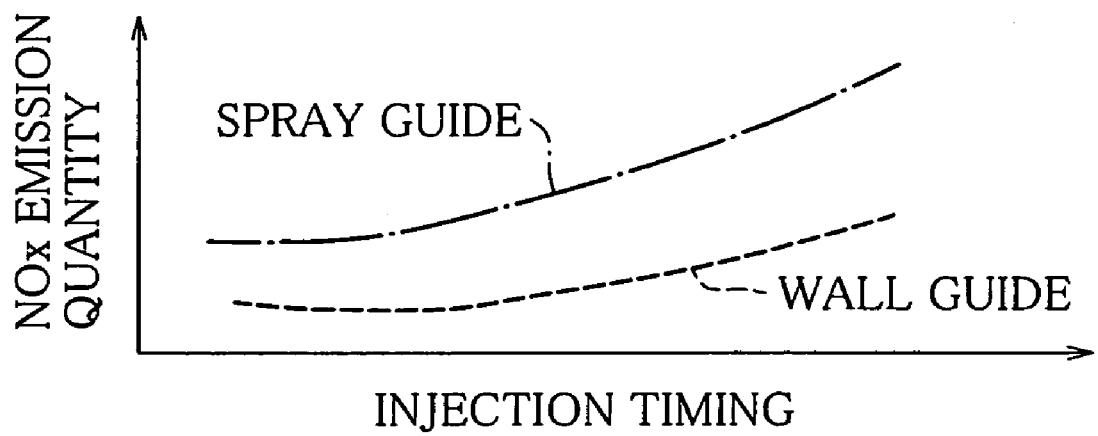
Figure 9C:
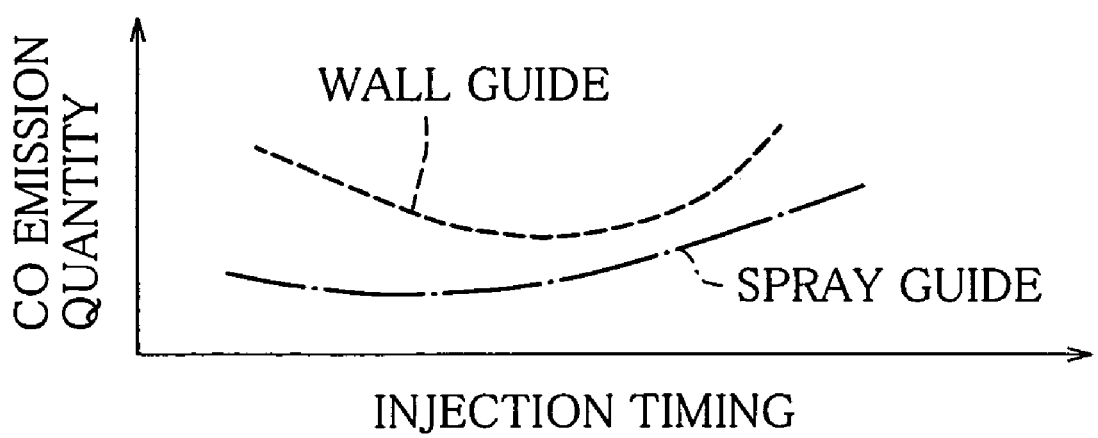

FIGS. 9A, 9B and 9C show HC emission quantity, NOx emission quantity and CO emission quantity, respectively, where each emission quantity is plotted on the vertical axis and injection timing is plotted on the horizontal axis.

As seen from these figures, the wall guide method has a feature that it produces greater HC emission, greater CO emission and smaller NOx emission, compared with the spray guide method.

Figure 10:
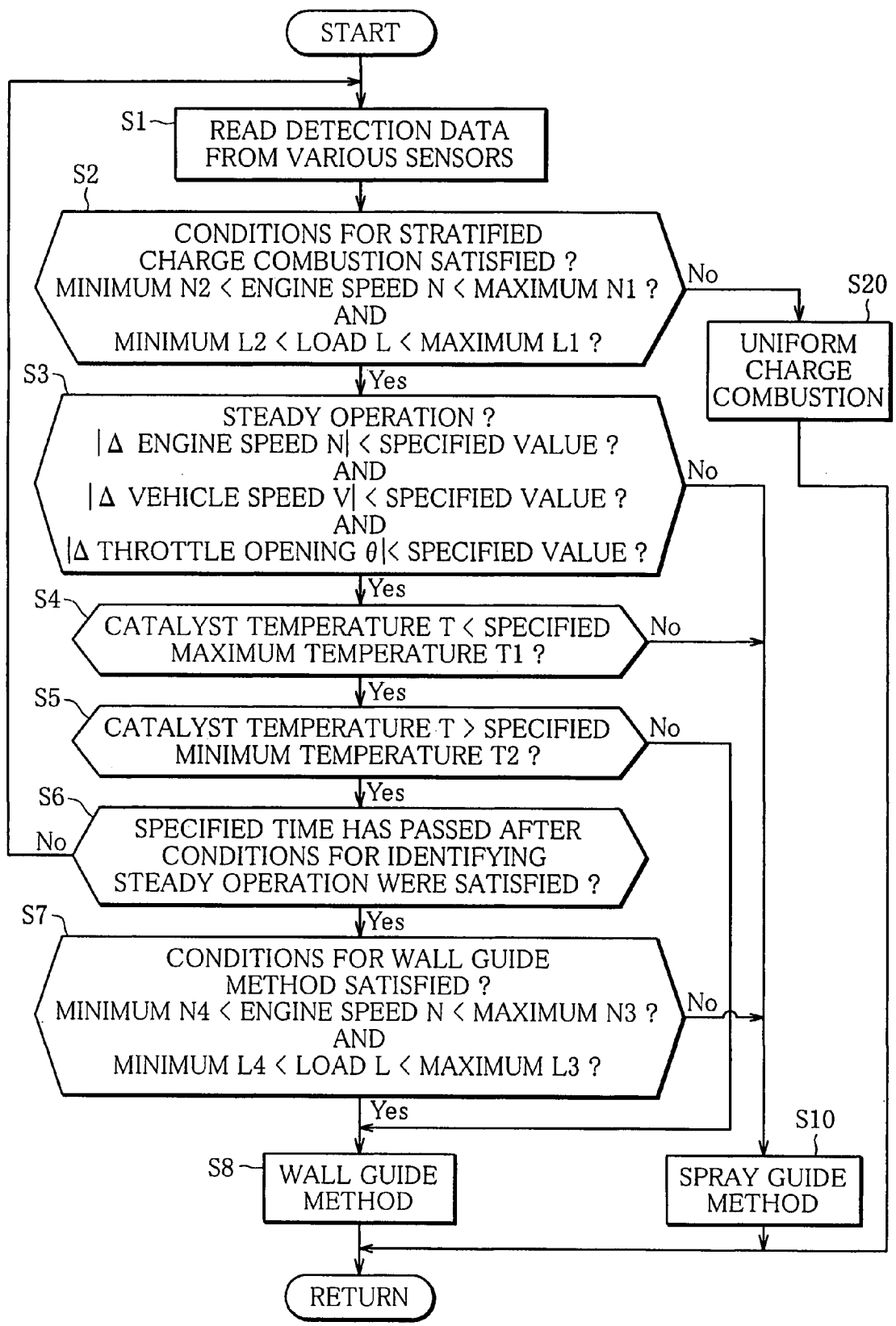
FIG. 10 is a flow chart showing a control routine for determining combustion method, executed by an ECU in the direct-injection spark-ignition internal combustion engine according to this invention.

FIG. 10 is a flow chart showing a control routine for determining combustion method, executed by the ECU 50 in the direct-injection spark-ignition internal combustion engine according to this invention. Description below will be made on the-basis of this flow chart.

First, in step S1, detection data of various kinds, including engine speed N from the engine speed sensor 56, accelerator depression Acc from the APS 52, throttle opening θ from the TPS 54, vehicle speed V from the vehicle speed sensor 58, catalyst temperature T from the catalyst temperature sensor 46, is read.

Then in step S2, whether or not the operational status of the engine 1 satisfies conditions for stratified charge combustion is determined, on the basis of the engine speed N and the engine load L calculated from the throttle opening θ. Specifically, whether or not the engine speed N is smaller than a maximum engine speed for stratified charge combustion N1 determined in advance and greater than a minimum engine speed for stratified charge combustion N2 determined in advance (N2<N<N1) is determined, and whether or not the engine load L is smaller than a maximum load for stratified charge combustion L1 determined in advance and greater than a minimum load for stratified charge combustion L2 determined in advance (L2<L<L1) is determined. If the result of the determination in step S2 is negative (No), step S20 is taken to carry out uniform charge combustion, with which the execution of the routine finishes. If the result of the determination in step S2 is positive (Yes), step S3 is taken.

In step S3, whether or not the engine 1 is in steady operation is determined by determining whether or not change per unit time of engine speed |ΔN|, change per unit time of vehicle speed |ΔV|, and change per unit time of throttle opening |Δθ| are smaller than specified values determined in advance for them, respectively. If the result of the determination in step S3 is negative (No), that is, the engine 1 is in transitional operation where any of the engine speed N, the vehicle speed V and the throttle opening θ changes by the specified value or greater per unit time, step S10 is taken to carry out combustion by the spray guide method, with which the execution of the routine finishes. By this, even when the engine 1 is in transitional operation, stratified charge combustion can be carried out stably.

Meanwhile, if the result of the determination in step S3 is positive (Yes), that is, the engine 1 is in steady operation, step S4 is taken.

In step S4, whether or not the catalyst temperature T is higher than a specified maximum temperature T1 determined in advance (second specified temperature) is determined. If the result of the determination in step S4 is positive (yes), that is, the catalyst temperature T is high, namely, equal to or higher than the specified maximum temperature T1, step S10 is taken to carry out combustion by the spray guide method. By carrying out combustion by the spray guide method when the catalyst temperature is high, like this, the HC emission quantity and the CO emission quantity can be decreased, so that rise in the catalyst temperature can be suppressed, so that deterioration of the catalyst and poisoning of the catalyst by oxygen can be suppressed.

Meanwhile, if the result of the determination in step S4 is negative (no), step S5 is taken.

In step S5, whether or not the catalyst temperature T is higher than a specified minimum temperature T2 determined in advance (first specified temperature) is determined. If the result of the determination in step S5 is negative (No), that is, the catalyst temperature T is low, namely, equal to or lower than the specified minimum temperature T2, step S8 is taken to carry out combustion by the wall guide method, with which the execution of the routine finishes. By carrying out combustion by the wall guide method when the catalyst temperature is low, like this, the HC emission quantity and the CO emission quantity can be increased, so that catalyzed oxidation reaction can be promoted, and heat generated in the oxidation reaction can cause rise in the catalyst temperature and thereby activate exhaust cleaning-up function.

Meanwhile, if the result of the determination in step S5 is positive (Yes), step S6 is taken.

In step S6, whether or not specified time determined in advance (2 seconds, for example) has passed after the conditions for identifying steady operation were satisfied in step S3 above. If the result of the determination in step S6 is negative (No), step S1 is taken again. If the result of the determination in step S6 is positive (Yes), that is, some time has passed after the engine came into steady operation, step S7 is taken.

In step S7, whether or not the operational status of the engine 1 satisfies the conditions for the wall guide method is determined, on the basis of the engine speed N and the engine load L. Specifically, whether or not the engine speed N is smaller than a maximum engine speed for stratified charge combustion N3 determined in advance and greater than a minimum engine speed for stratified charge combustion N4 determined in advance (N4<N<N3) is determined, and whether or not the engine load L is smaller than a maximum load for stratified charge combustion L3 determined in advance and greater than a minimum load for stratified charge combustion L4 determined in advance (L4<L<L3) is determined. If the result of the determination in step S7 is positive (Yes), step S8 is taken to carry out combustion by the wall guide method, with which the execution of the routine finishes. Meanwhile, if the result of the determination in step S7 is negative (No), Step S10 is taken to carry out combustion by the spray guide method, with which the execution of the routine finishes.

By carrying out combustion by the spray guide method when the operational status of the engine 1 satisfies the conditions for stratified charge combustion and the engine 1 is in transitional operation, as described above, stable combustion not easily affected by change in engine speed N and engine load L can be achieved.

Further, when the engine 1 is in steady operation, change between the spray guide method and the wall guide method is carried out by choosing one which is better in fuel economy, etc., depending on the engine speed N and the load L. Change between the spray guide method and the wall guide method is also carried out depending on the catalyst temperature T to always put the exhaust catalytic converter 44 at optimal temperature so that the exhaust catalytic converter can perform exhaust cleaning-up function satisfactorily. Consequently, harmful substances contained in exhaust gas can be reduced sufficiently.

Further, even if ignition by the spray guide method fails or flames happen to stop spreading after ignition by the spray guide method, combustion can be accomplished by carrying out ignition by the wall guide method subsequently.

Specifically, in the direct-injection spark-ignition internal combustion engine according to this invention, the wall guide method can be carried out only by retarding the ignition timing compared with the spray guide method. Hence, by providing a misfire detection means, for example, it can be easily arranged such that, even if ignition by the spray guide method fails, misfire is detected and ignition is achieved by the wall guide method soon afterward.

It can be arranged such that so-called double ignition is carried out such that whenever combustion is carried out by the spray guide method, ignition by the spray guide method is followed by ignition by the wall guide method.

By this, stable combustion region can be expanded, so that stability of stratified charge combustion can be further improved.

The above is the description of the direct-injection spark-ignition internal combustion engine in one embodiment of the present invention. The present invention is, however, not limited to the above-described embodiment.

For example, in the above embodiment, the combustion method to be adopted is determined on the basis of the operational status of the engine 1 and the catalyst temperature. However, the determination may be made on the basis of only one of these factors, or another factor may be also considered to determine the combustion method to be adopted.

Further, in the above embodiment, the APS 52, the TPS 54, the engine speed sensor 56 and the vehicle speed sensor 58 are used as the operational status detection means. However, the operational status detection means is not limited to these devices. The operational status of the engine 1 may be detected from another factor using another device.

Further, in the above embodiment, the exhaust catalytic converter 44 is a three-way catalytic converter. However, the exhaust catalytic converter is not limited to this but can be of another type.

The invention being thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. A direct-injection spark-ignition internal combustion engine, comprising:
   an injector fitted to an upper wall of a combustion chamber, in a central area thereof, for injecting fuel directly into the combustion chamber,
   an ignition plug provided with an electrode part positioned within or near a fuel injection area in which fuel injected by the injector spreads,
   a cavity formed in a top face of a piston to guide fuel injected by the injector to near the electrode part of the ignition plug,
   operational status detection means for detecting operational status of the internal combustion engine indicative of a steady operation state of the internal combustion engine, and
   ignition timing control means for controlling ignition timing for the ignition plug, wherein
   the ignition timing control means controls the ignition timing, depending on the operational status detected by the operational status detection means, such that ignition is carried out at least either during or immediately after fuel injection by the injector, or at the time when fuel injected by the injector arrives near the electrode part by being guided by the cavity.

2. The direct-injection spark-ignition internal combustion engine according to claim 1, wherein
   the ignition timing control means controls the ignition timing such that, when a non-steady operation state of the internal combustion engine is detected by the operational status detection means, ignition is carried out by the ignition plug during or immediately after fuel injection by the injector.

3. The direct-injection spark-ignition internal combustion engine according to claim 1, further comprising:
misfire detection means for detecting misfire occurring within the combustion chamber, wherein
the ignition timing control means controls the ignition timing such that ignition is carried out during or immediately after fuel injection by the injector, and if the misfire detection means detects misfire at the time of this ignition, ignition is also carried out at the time when an air-fuel mixture formed by more vaporized fuel arrives near the electrode part by being guided by the cavity.

4. The direct-injection spark-ignition internal combustion engine according to claim 1, wherein,
the ignition timing control means controls the ignition timing such that whenever ignition is carried out during or immediately after fuel injection by the injector, ignition is also carried out at the time when an air-fuel mixture formed by fuel injected by the injector and more vaporized arrives near the electrode part by being guided by the cavity.

5. The direct-injection spark-ignition internal combustion engine according to claim 1, wherein,
the operational status detection means determines that the internal combustion engine is in the steady operation state when at least one of a change in an engine speed, a change in a vehicle speed, and a change in a throttle opening is within a predetermined value.

6. The direct-injection spark-ignition internal combustion engine according to claim 5, wherein,
the operational status detection means determines that the internal combustion engine is in the steady operation state when the in the engine speed is within a first predetermined value, the change in the vehicle speed is within a second predetermined value, and the change in the throttle opening is within a third predetermined value.

7. A direct-injection spark-ignition internal combustion engine, comprising:
an injector fitted to an upper wall of a combustion chamber, in a central area thereof, for injecting fuel directly into the combustion chamber,
an ignition plug provided with an electrode part positioned within or near a fuel injection area in which fuel injected by the injector spreads,
a cavity formed in a top face of a piston to guide fuel injected by the injector to near the electrode part of the ignition plug,
an exhaust catalytic converter provided in an exhaust path connected with the combustion chamber, for converting harmful substances contained in exhaust gas flowing through the exhaust path,
catalyst temperature detection means for detecting temperature of the exhaust catalytic converter,
operational status detection means for detecting operational status of the internal combustion engine indicative of a steady operation state of the internal combustion engine;
injection timing control means for controlling injection timing for the injector, and
ignition timing control means for controlling ignition timing for the ignition plug, wherein
the injection timing control means and the ignition timing control means selects between a first operation mode in which ignition is carried out during or immediately after fuel injection by the injector and a second operation mode in which ignition is carried out at the time when fuel injected by the injector arrives near the electrode part by being guided by the cavity, depending on the temperature of the exhaust catalytic converter detected by the catalyst temperature detection means when the steady operation state of the internal combustion engine is detected by the operational status detection means.

8. The direct-injection spark-ignition internal combustion engine according to claim 7, wherein
when the temperature of the exhaust catalytic converter detected by the catalyst temperature detection means is equal to or lower than a first specified temperature, the injection timing control means and the ignition timing control means choose the operation mode in which ignition is carried out at the time when fuel injected by the injector arrives near the electrode part by being guided by the cavity.

9. The direct-injection spark-ignition internal combustion engine according to claim 8, wherein
when the temperature of the exhaust catalytic converter detected by the catalyst temperature detection means is equal to or higher than a second specified temperature which is higher than the first specified temperature, the injection timing control means and the ignition timing control means choose the operation mode in which ignition is carried out during or immediately after fuel injection by the injector.

10. The direct-injection spark-ignition internal combustion engine according to claim 7, further comprising:
misfire detection means for detecting misfire occurring within the combustion chamber, wherein
the ignition timing control means controls the ignition timing such that ignition is carried out during or immediately after fuel injection by the injector, and if the misfire detection means detects misfire at the time of this ignition, ignition is also carried out at the time when an air-fuel mixture formed by more vaporized fuel arrives near the electrode part by being guided by the cavity.

11. The direct-injection spark-ignition internal combustion engine according to claim 7, wherein
the ignition timing control means controls the ignition timing such that whenever ignition is carried out during or immediately after fuel injection by the injector, ignition is also carried out at the time when an air-fuel mixture formed by fuel injected by the injector and more vaporized arrives near the electrode part by being guided by the cavity.

12. The direct-injection spark-ignition internal combustion engine according to claim 7,
wherein when the temperature of the exhaust catalytic converter detected by the catalyst temperature detection means is between the first specified temperature and the second specified temperature, the ignition timing control means and the ignition timing control means selects between the first operation mode and the second operation mode based on an engine speed and an engine load.

* * * * *